United States Patent [19]
Shirouzu

[11] Patent Number: 5,502,795
[45] Date of Patent: Mar. 26, 1996

[54] ANTIALIAS LINE GENERATING METHOD AND ANTIALIAS LINE GENERATOR

[75] Inventor: Hiroshi Shirouzu, Fukuoka, Japan

[73] Assignee: Matsushita Electric Industrial Co., Ltd., Osaka, Japan

[21] Appl. No.: 293,186

[22] Filed: Aug. 19, 1994

[30] Foreign Application Priority Data

Aug. 31, 1993 [JP] Japan .................. 5-214657

[51] Int. Cl.⁶ .................................. G06F 15/62
[52] U.S. Cl. .................................. 395/109; 382/269
[58] Field of Search ............................ 395/100, 106, 395/109, 128, 129, 132, 143; 358/525, 532; 382/269

[56] References Cited

U.S. PATENT DOCUMENTS

| | | | |
|---|---|---|---|
| 4,586,037 | 4/1986 | Rosener et al. | 340/728 |
| 4,593,372 | 6/1986 | Bandai et al. | 364/719 |
| 5,020,014 | 5/1991 | Miller et al. | 364/723 |
| 5,122,884 | 6/1992 | Gilbert et al. | 358/298 |
| 5,167,015 | 11/1992 | Bair et al. | 395/143 |
| 5,234,650 | 8/1993 | Priem et al. | 395/143 |
| 5,274,754 | 12/1993 | Sfarti | 395/142 |
| 5,287,442 | 2/1994 | Alcorn et al. | 395/143 |
| 5,333,250 | 7/1994 | Staley, II et al. | 395/143 |
| 5,351,315 | 9/1994 | Ueda et al. | 382/54 |
| 5,381,519 | 1/1995 | Brown et al. | 395/132 |

*Primary Examiner*—Mark R. Powell
*Assistant Examiner*—Gabriel I. Garcia
*Attorney, Agent, or Firm*—Spencer & Frank

[57] ABSTRACT

An antialias line generator has a line sequencer for performing axis interpolation, an intension interpolator for performing intension interpolation, and a write axis calculator for producing information about two pixels constituting opposite ends of a line during one machine clock on the basis of interpolation information obtained from the line interpolator and intension interpolator. With the above construction, axis interpolation is carried out by applying start and end points of the line to the line interpolator, intension interpolation is carried out by applying a pixel intensity to the intension interpolator, axes of two pixels constituting the opposite ends of the line are calculated by applying the line axis obtained from the line interpolator and a related axis obtained from the intension interpolator to the write axis calculator, and a smooth line can be drawn by writing an actual pixel on the basis of the drawing intensity data obtained from the intension interpolator and a drawing axis data signal obtained from the write axis calculator.

7 Claims, 17 Drawing Sheets

129 DRAW 1X AXIS
130 DRAW 2X AXIS $WX1 = X_{LATCH} + CENT/2 - S$ $WX2 = X_{LATCH} + CENT/2 + S$ $X_{LATCH}$ ; LATCHED AT (X, BEGIN)

ANTIALIAS LINE GENERATING METHOD AND ANTIALIAS LINE GENERATOR

BACKGROUND OF THE INVENTION

1. Field of the Invention

The present invention relates to antialias line generating method and antialias line generator for smoothly drawing an oblique line by using a CRT or the like.

2. Description of the Related Art

In recent years, an image display apparatus having high precision has been utilized in the field of computer graphics. Especially, in an effort to further enhance precision, a method has been developed which strengthen or weaken the pixel intensity to enhance apparent precision, the method being simply referred to as antialiasing hereinafter.

Conventional antialiasing will be described hereunder. FIG. 17 is a schematic diagram showing the contents of an antialias line generator for realization of the conventional antialiasing. In the Figure, the antialias line generator for calculating the pixel intensity is designated by reference numeral 201 and it comprises a line interpolator 202 for interpolating the precision of the pixel intensity with a precision which is increased four times in X and Y axes, on the basis of start and end points of a line and a drawing unit circle for validating a range within which the pixel intensity is interpolated, a pixel ratio calculator 203 for calculating a ratio of the number (or area) of sub-pixels whose intensity is interpolated for display to the entire area of a pixel which is divided into four divisions in X and Y axes, that is, an area of all of the 16 sub-pixels, and a pixel intensity validator 204 for calculating drawing axes and drawing intensity data from the calculated pixel ratio and current intensity data being present before display of the line (accordingly, defining a background after display of the line).

A line is represented by axes of start and end points and 221 designates a line start point X axis (x1), 222 a line start point Y axis (y1), 223 a line end point X axis (x2) and 224 a line end point Y axis (y2). Denoted by 227 is a draw signal for commanding the start of drawing. The above signals are input to the line interpolator 202.

Denoted by 225 is current intensity data and by 226 is pixel intensity data representative of intensity of a line to be drawn. These signals of the intensity data are input to the pixel intensity validator 204.

Obtained pixel drawing intensity data 228 is indicated in terms of pixel axis by using a draw X axis (x3) 229 and a draw Y axis (y3) 231 and when the drawing intensity data 228, draw X axis (x3) 229 and draw Y axis (y3) 231 are validated, a pixel intensity valid signal 233 is delivered. The above operation is repeated and when all of interpolation operations for the line are completed, a draw terminate signal 234 is delivered. The above signals 228, 229, 231, 233 and 234 constitute output signals of the pixel intensity validator 204.

FIG. 18 shows an example of a display image according to the conventional antialiasing and FIG. 19 is an enlarged view of a pixel in FIG. 18. In FIGS. 18 and 19, reference numeral 301 designates a drawing screen raster 1, 302 a drawing screen raster 2, 303 a drawing screen raster 3, 304 a drawing screen raster 4, 305 a drawing screen raster 5, 306 a drawing screen raster 6, 307 a drawing screen raster 7, 308 a drawing screen position a, 309 a drawing screen position b, 310 a drawing screen position c, 311 a drawing screen position d, 312 a drawing screen position e, 313 a drawing screen position f, 314 a drawing line, 316 a normal line drawing position, 501 a pixel in question, 502 a drawing unit circle, 503 an upper locus of the drawing unit circle, and 504 a lower locus of the drawing unit circle.

Operation will now be described in connection with the conventional antialiasing as above. Firstly, the line interpolator 202 receives the line start point X axis 221, line start point Y axis 222, line end point X axis 223 and line end point Y axis 224 which indicate axes of opposite ends of a line and the draw signal 227 for commanding drawing of the line, and starts line interpolation. At that time, by virtually setting drawing unit circles 502 at start and end points, upper and lower loci 503 and 504 of the drawing unit circles 502 which are tangents thereto are assumed, and pixels through which the upper and lower loci 503 and 504 pass are interpolated with a precision which is increased four times in X and Y axes.

Next, the pixel ratio calculator 203 (FIG. 17) determines a pixel ratio of an area surrounded by the upper and lower loci 503 and 504 to the entirety of a pixel. For example, to describe a pixel 501 in question, the pixel 501 of interest consists of 16 sub-pixels and since the number of sub-pixels existing in an area, which is surrounded by the upper and lower loci 503 and 504 and in which these sub-pixels are present even partly, is seven, the pixel ratio at the pixel 501 of interest is determined to be 7/16.

Further, the pixel intensity validator 204 calculates intensity of the pixel to be displayed at the interpolated intensity on the basis of the calculated pixel ratio, current intensity data 225 and pixel intensity data 226 and delivers drawing intensity data 228. At the same time, the draw X axis (x3) 229 and draw Y axis (y3) 231 which are indicative of a display axis and the pixel intensity valid signal 233 are delivered, completing drawing of one pixel.

To describe the correspondence between the above signals and the display screen, intensity displayed at the normal line drawing point 316 (pixels hatched in FIG. 18) corresponds to the pixel intensity data 226, intensity displayed at the pixel 501 of interest corresponds to the drawing intensity data 228 and intensity of pixel at blank portions in FIG. 18 corresponds to the current intensity data 225.

On the assumption that the pixel intensity data 226 is of an intensity of 100 and the current intensity data 225 is of an intensity of 30, the pixel ratio 7/16 obtained in FIG. 19 is used to determine the drawing intensity data 228 which is (30+(100−30)*7/16).

The above operation is repeated until interpolation of line 314 represented by the line start point X axis 221, line start point Y axis 222, line end point X axis 223 and line end point Y axis 224 ends and when the interpolation ends, the pixel intensity validator 204 delivers the draw terminate signal 234, thus terminating the drawing of the line.

However, in order to realize the line drawing by using the conventional antialiasing method, there is needed a process step of generating two lines represented by the virtual upper and lower loci 503 and 504 and deciding an area and a process step of performing calculation including division to determine a pixel ratio (7/16 shown in FIG. 19) on the basis of the area decision. In particular, these process steps are carried out through logical operation based on software and therefore depend on the throughput of the computer, making it difficult to increase the drawing speed.

SUMMARY OF THE INVENTION

An object of the present invention is to provide antialias line generating method and antialias line generator which can perform antialiasing drawing of an oblique line at a high speed.

The antialias line generator of the present invention comprises a line interpolator for performing axis interpolation, an intensity interpolator for performing intensity interpolation, and a write axis calculator for producing information about two pixels constituting opposite ends of a line during one machine clock on the basis of interpolation information produced from the line interpolator and intensity interpolator.

According to the present invention, with the above construction, axis interpolation is carried out by applying start and end points of an oblique line to the line interpolator, intensity is interpolated by applying intensity of the oblique line to the intensity interpolator, axes of the two pixels constituting the opposite ends of the oblique line are calculated by applying axes of the line produced from the line interpolator and a related axis produced from the intensity interpolator to the write axis calculator, and antialiasing drawing of a smooth oblique line can be ensured by writing an actual pixel on the basis of a drawing intensity data signal produced from the intensity interpolator and a drawing axis data signal produced from the write axis calculator. Further, since the line interpolator and the intensity interpolator can be realized with logical circuits in the form of up/down counters, a high drawing speed can be realized.

DESCRIPTION OF THE PREFERRED EMBODIMENTS

Figure 1:
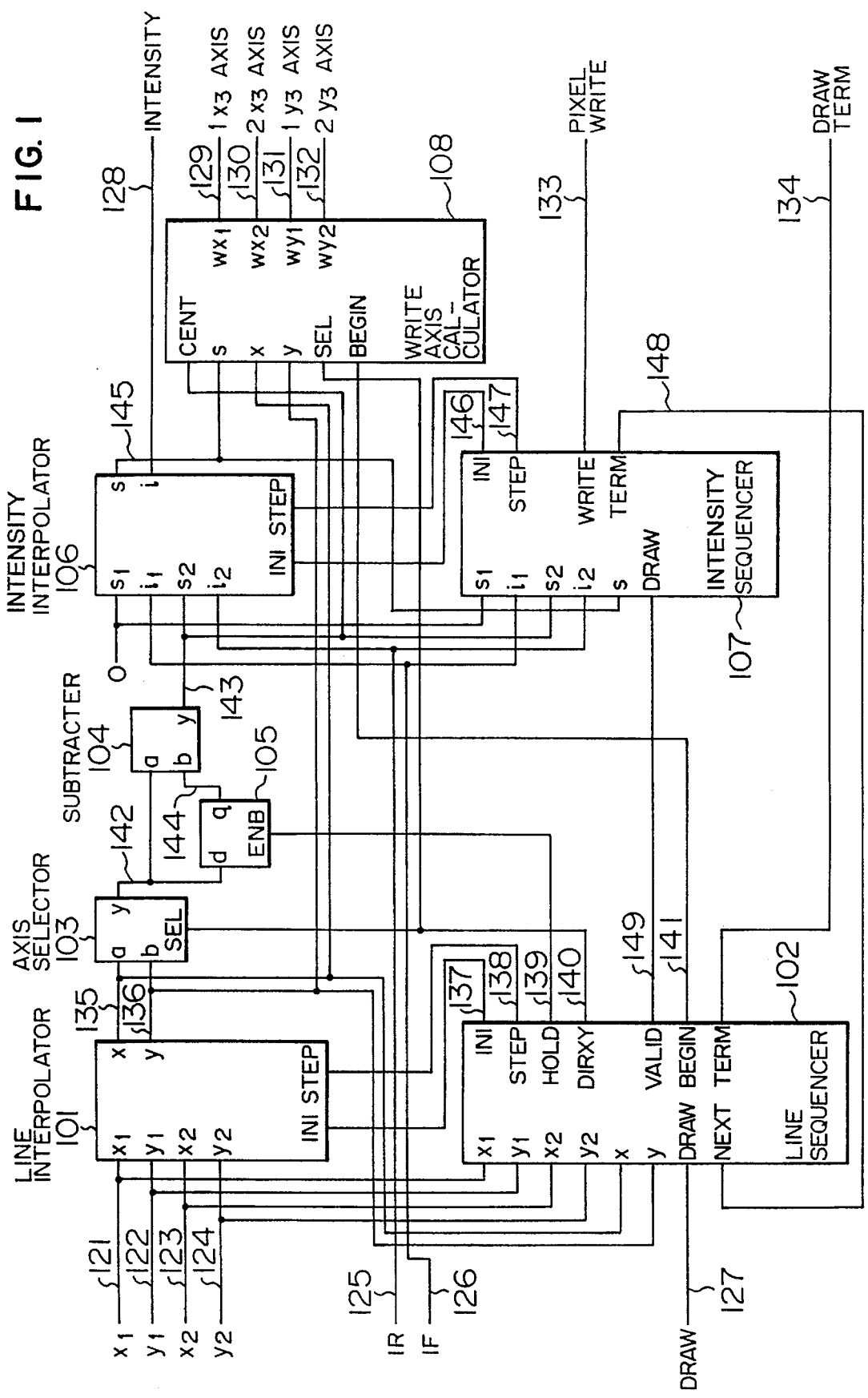
FIG. 1 is a block diagram showing an embodiment of antialias line generator according to the present invention.

The present invention will now be described by way of example with reference to the accompanying drawings. FIG. 1 is a block diagram showing an embodiment of an antialias line generator according to the present invention. Referring to FIG. 1, a line interpolator 101 is comprised of presettable up/down counters and performs axis interpolation on the basis of axes of opposite ends of a line, a line sequencer 102 is comprised of logical elements for control of the line interpolator 101 and controls the sequence of axis interpolation, an axis selector 103 is comprised of selector elements and selects data of axis X or axis Y in accordance with an inclination of the line, a subtracter 104 is comprised of subtraction elements and subtracts axis data to be interpolated from selected axis data, an axis latch 105 is a latch comprised of flip-flop elements and latches axis data to be interpolated, an intensity interpolator 106 is comprised of presettable up/down counters and performs intensity interpolation on the basis of current intensity data and pixel intensity data, an intensity sequencer 107 is comprised of logical elements for control of the intensity interpolator 106 and controls the sequence of intensity interpolation, and a write axis calculator 108 is comprised of calculators and performs calculation which begins with the center axis of a pixel to be displayed to determine axes of opposite ends of the pixel to be displayed.

In connection with principal signals and data indicative of the operation, a line is represented by axes of its start and end points and input signals representative of a line start point X axis (x1) 121, a line start point Y axis (y1) 122, a line end point X axis (x2) 123 and a line end point Y axis (y2) 124 are applied to the line interpolator 101.

A draw signal 127 for commanding the initiation of drawing starts the operation of the line sequencer 102.

Current intensity data 125 indicates the intensity of current area before display of the line (which forms a background after display of the line), pixel intensity data 126 indicates the intensity of the line to be drawn and these signals are inputted to the intensity interpolator 106 and intensity sequencer 107. Drawing intensity data 128 of a determined pixel is delivered out of the intensity interpolator 106.

Axes of opposite ends within a range for display at the same intensity as that of the pixel to be displayed are generated by the write axis calculator 108, having smaller axis values represented by a draw X axis (1X3) 129 and a draw Y axis (1Y3) 131 and larger axis values represented by a draw X axis (2X3) 130 and a draw Y axis (2Y3) 132.

Further, when the drawing intensity data 128 and the axes of the opposite ends represented by the draw X axis (1X3) 129, draw Y axis (1Y3) 131, draw X axis (2X3) 130 and draw Y axis (2Y3) 132 are validated, the intensity sequencer 107 delivers a pixel intensity valid (WRITE) signal 133. The above operation is repeated and at the completion of all of the interpolation operations of the line, a draw terminate signal 134 is delivered out of the line sequencer 102.

Figure 2:
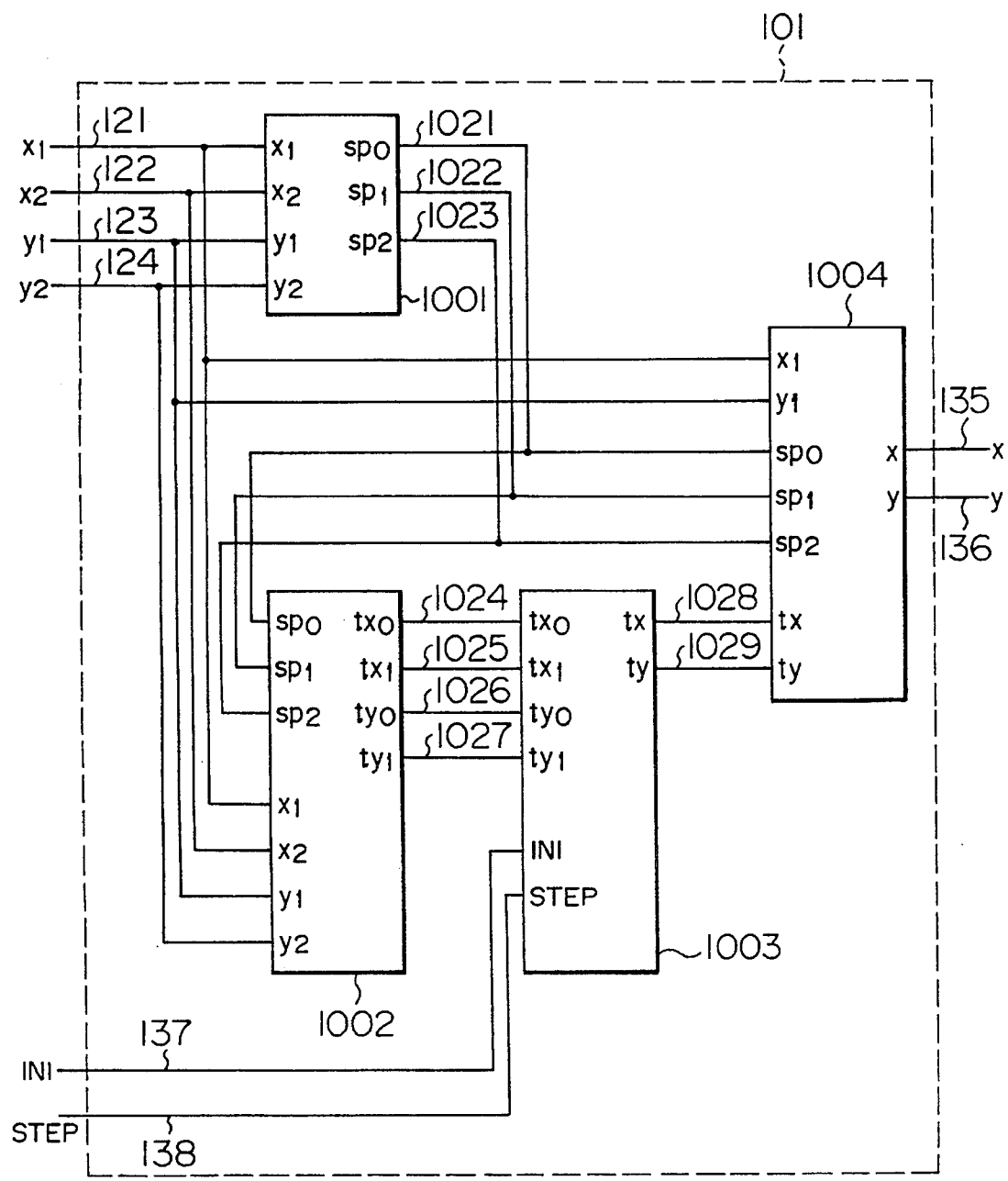
FIG. 2 shows the construction of a line interpolator constituting the antialias line generator of FIG. 1.
Figure 4:
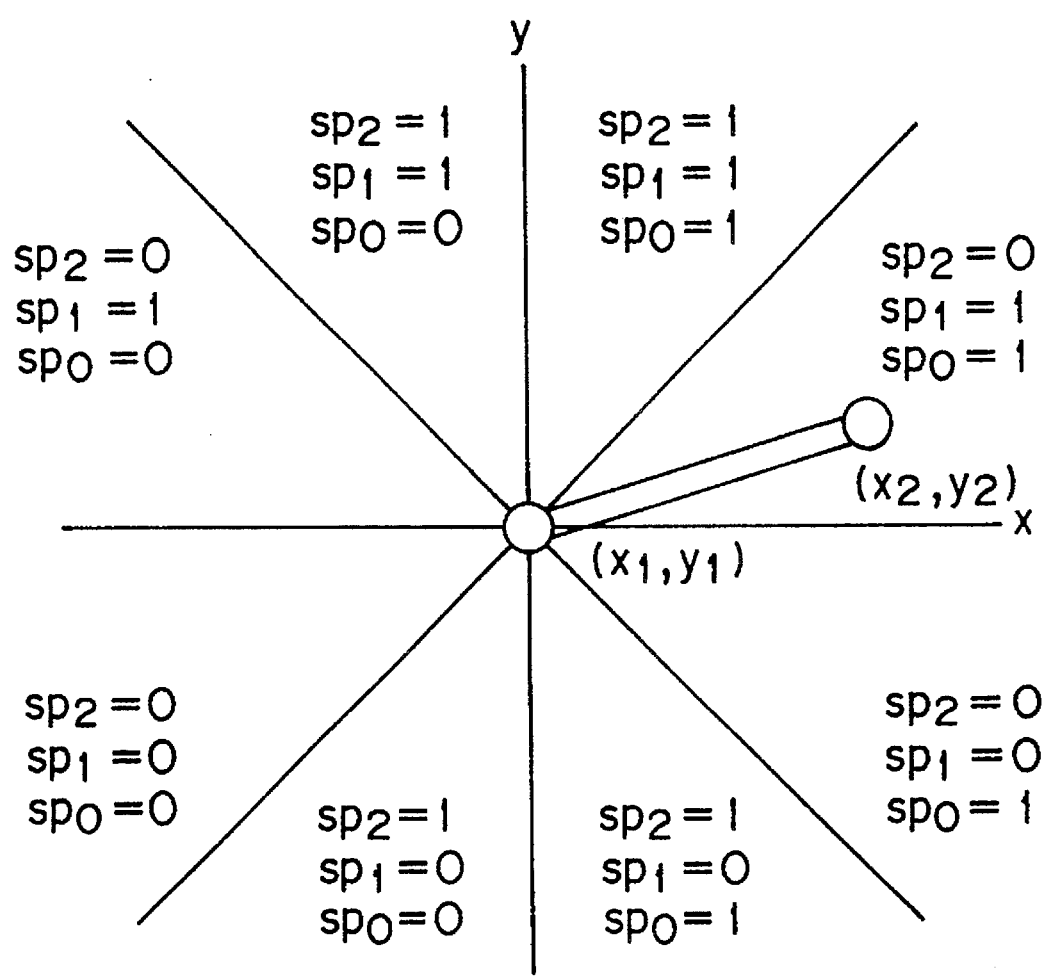
FIG. 4 shows given line axes and decision results of the quadrant analyzer of FIG. 3.

FIG. 2 shows the construction of the line interpolator 101. The line interpolator 101 includes a quadrant analyzer 1001, a mapping transformer 1002, a DDA calculator 1003 and a mapping inverse transformer 1004. These units are comprised of presettable up/down counters. When the quadrant analyzer 1001 receives the line start point X axis signal 121, line end point X axis signal 122, line start point Y axis signal 123 and line end point Y axis signal 124, it analyzes which quadrant a given line belongs to and delivers quadrant analysis signals 1021, 1022 and 1023. The relation between the given line and each of the quadrant analysis signals (SP0, SP1, SP2) is shown in FIG. 4.

When the mapping transformer 1002 receives the line start point X axis signal 121, line end point X axis signal 122, line start point Y axis signal 123 and line end point Y axis signal 124 as well as the quadrant analysis signals 1021, 1022 and 1023 from the quadrant analyzer 1001, it delivers line axis signals 1024, 1025, 1026 and 1027 which are projected on an area having an inclination angle of 45 degrees or less in the first quadrant.

The DDA calculator 1003 receives the line axis signals 1024, 1025, 1026 and 1027 from the mapping transformer 1002 as well as an ini signal 137 and a step signal 138 and delivers line interpolation axis signals 1028 and 1029.

The mapping inverse transformer 1004 receives the line start point X axis signal 121, line start point Y axis signal 123 and the line interpolation axis signals 1028 and 1029 from the DDA calculator 1003 as well as the quadrant analysis signals 1021, 1022 and 1023 from the quadrant analyzer 1001 and delivers an interpolated X axis signal 135 and an interpolated Y axis signal 136.

The line interpolator 101 thus generates a line interpolated signal from the inputted line axis signals.

Figure 3:
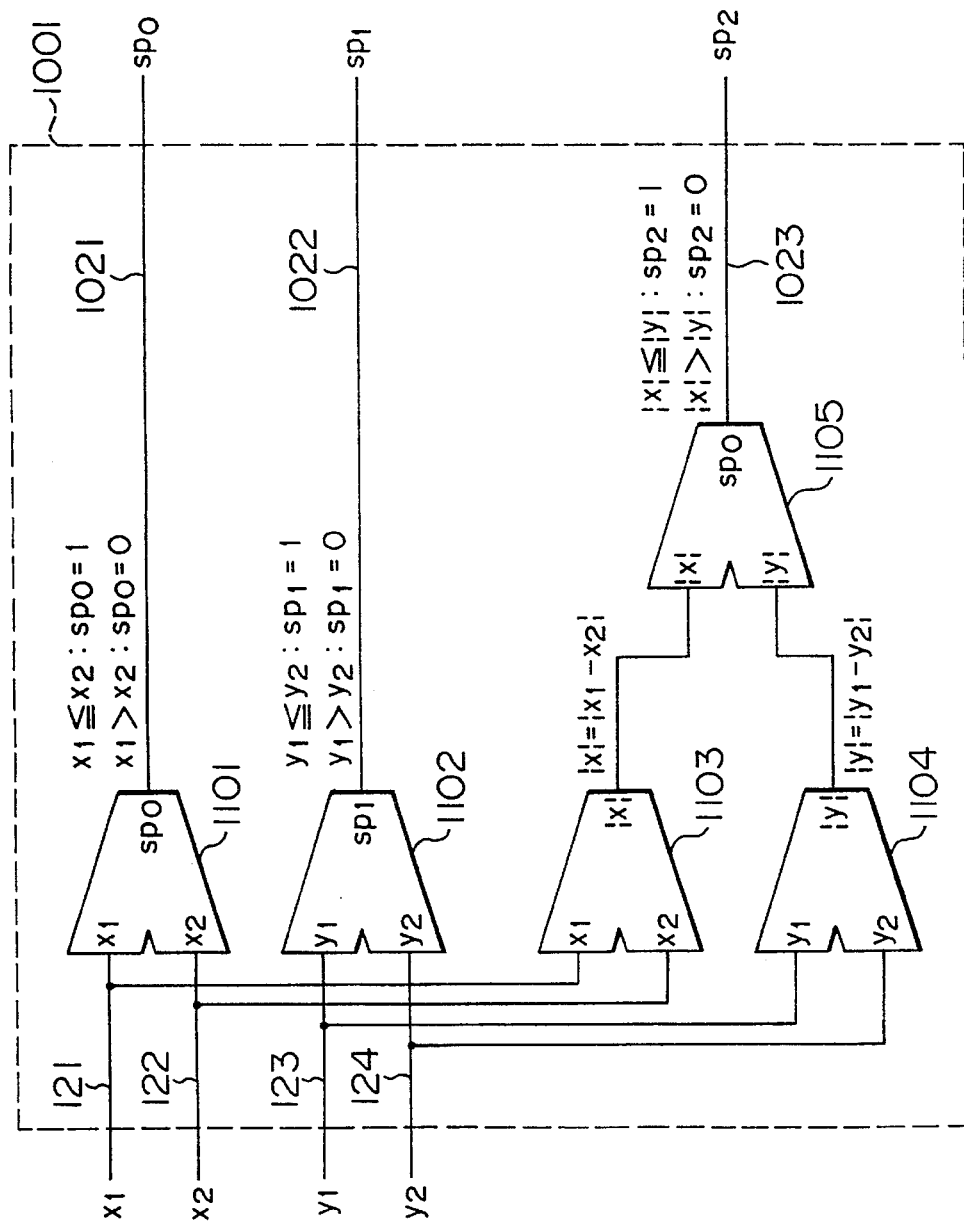
FIG. 3 shows the construction of a quadrant analyzer constituting the line interpolator of FIG. 2.

FIG. 3 shows the construction of the quadrant analyzer 1001, and FIG. 4 shows given line axes and decision results of the quadrant analyzer of FIG. 3. The quadrant analyzer 1001 includes five calculators 1101, 1102, 1103, 1104 and 1105. The calculator 1101 generates a quadrant analysis signal 1021 indicating which of the first and fourth quadrants or the second and third quadrants the given line lies in. The calculator 1102 generates a quadrant analysis signal 1022 indicating which of the first and second quadrants or the third and fourth quadrants the given line lies in. The calculators 1103, 1104 and 1105 generate a quadrant analysis signal 1023 indicating whether the given line has an inclination of 45 degrees or less. By performing the above operation, the quadrant analyzer 1001 decides which quadrant the line lies in when the start point of the line is used as a reference point.

Figure 5:
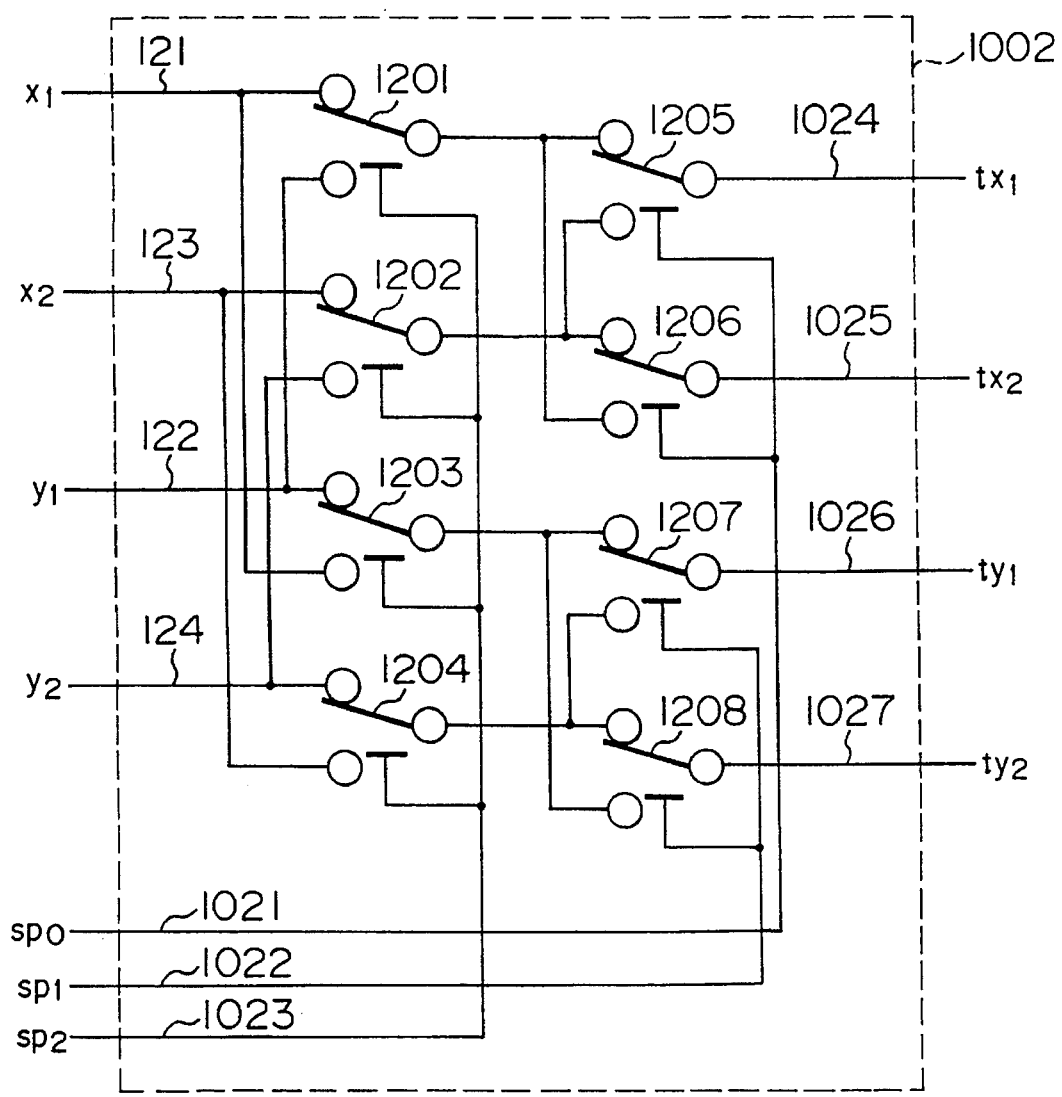
FIG. 5 shows the construction of a mapping transformer constituting the line interpolator of FIG. 2.

FIG. 5 shows the construction of the mapping transformer 1002. The mapping transformer 1002 includes eight set signal switches 1201, 1202, 1203, 1204, 1205, 1206, 1207 and 1208. The mapping transformer 1002 performs mapping transform of an object on X axis when the quadrant analysis signal 1021 is applied to the switches 1205 and 1206, performs mapping transform of an object on Y axis when the quadrant analysis signal 1022 is applied to the switches 1207 and 1208, and performs mapping transform of an object at 45 degrees when the quadrant analysis signal 1023 is applied to the switches 1201, 1202, 1203 and 1204. By performing the above operation, the mapping transformer 1002 projects the given line on an area having an inclination of 45 degrees or less in the first quadrant.

Figure 6:
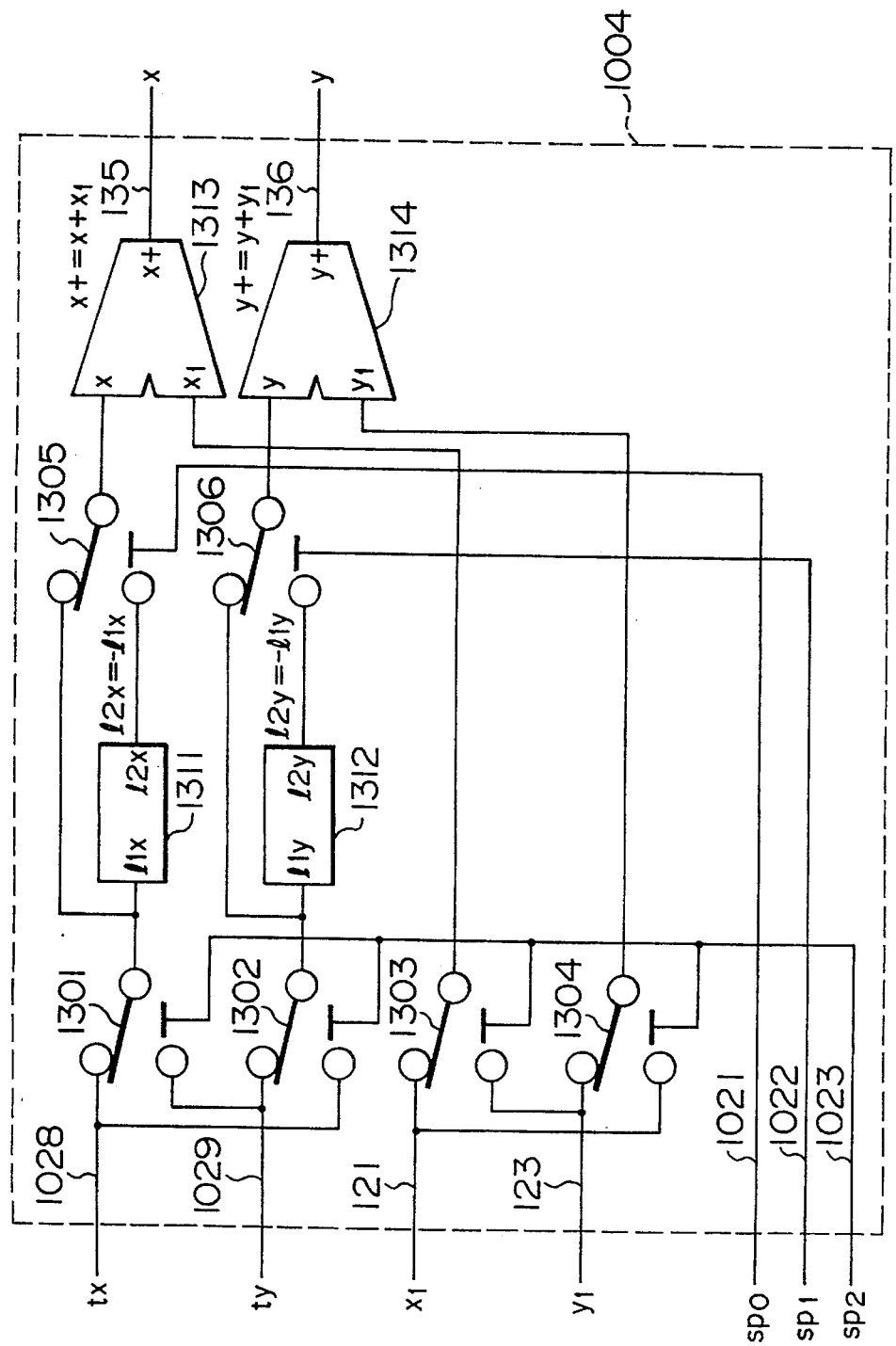
FIG. 6 shows the construction of a mapping inverse transformer constituting the line interpolator of FIG. 2.

FIG. 6 shows the construction of the mapping inverse transformer 1004. The mapping inverse transformer 1004 includes four calculators 1311, 1312, 1313 and 1314 and six set signal switches 1301, 1302, 1303, 1304, 1305 and 1306. The mapping inverse transformer 1004 performs mapping transform of an object on X axis when the quadrant analysis signal 1021 is applied to the switch 1305, performs mapping transform of an object on Y axis when the quadrant analysis signal 1022 is applied to the switch 1306 and performs mapping transform of an object at 45 degrees when the quadrant analysis signal 1023 is applied to the switches 1301, 1302, 1303 and 1304. By performing the above operation, the mapping inverse transformer 1004 performs re-projection of the line interpolation axis on real mapping.

Figure 7:
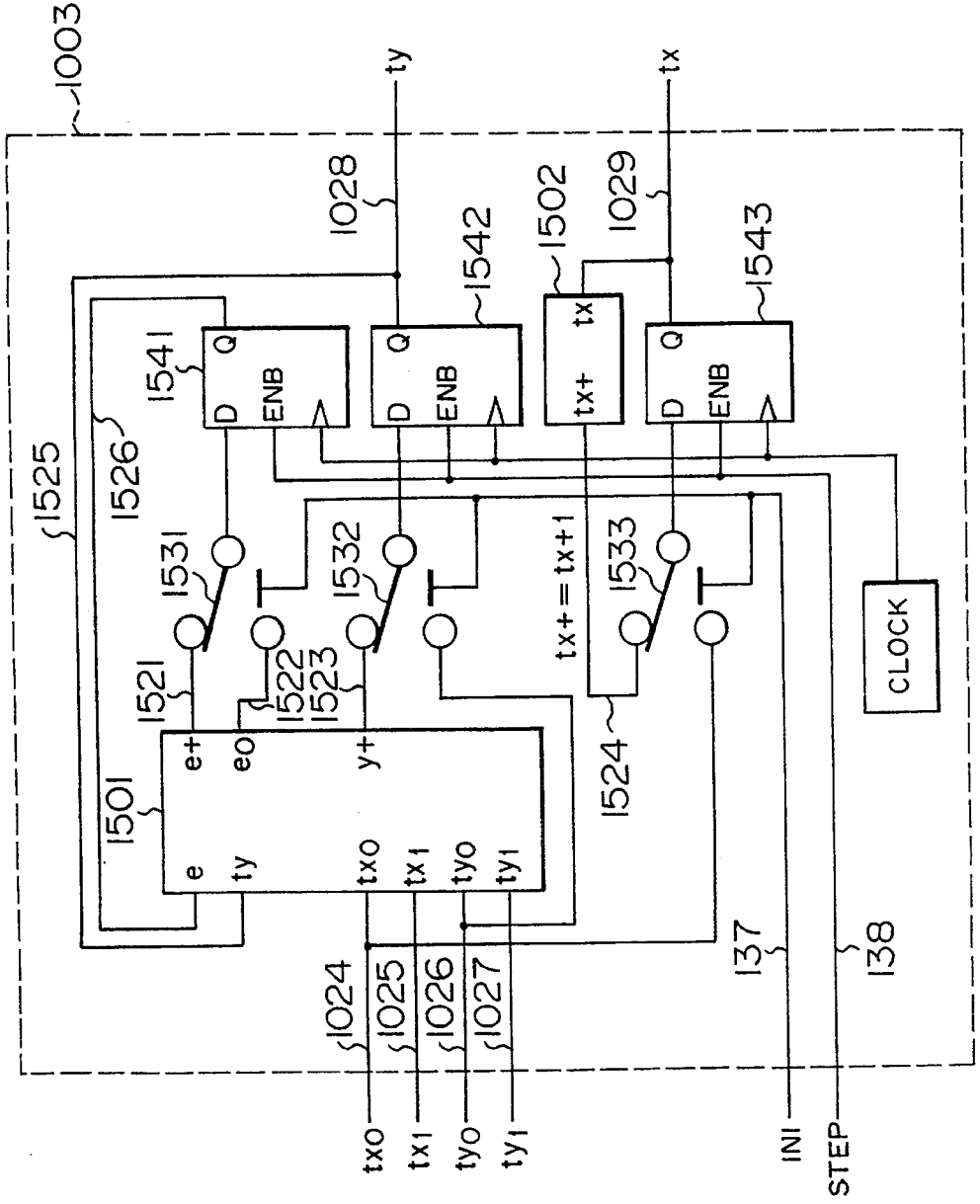
FIG. 7 shows the construction of a DDA converter constituting the line interpolator of FIG. 2.

FIG. 7 shows the construction of the DDA calculator 1003. The DDA calculator 1003 includes two pre-calculators 1501 and 1502 for performing DDA, three set signal switches 1531, 1532 and 1533 and three set signal latches 1541, 1542 and 1543. When the set signal switches 1531, 1532 and 1533 receive the ini signal 137, the respective set signal switches set an initiation point error initial value 1522, initiation point X axis 1024 and initiation point Y axis 1026 of the precalculator 1501. Further, when the set signal latches 1541, 1542 and 1543 receive the step signal 138, the respective set signal latches set an error value 1521 and a Y axis 1523 of the pre-calculator 1501 and an X axis 1524 of the pre-calculator 1502. The step signal 138 is delivered all the time during the line drawing. By performing the above operation, the DDA calculator 1003 performs calculation of line interpolation axis at an inclination of 45 degrees or less in the first quadrant.

Figure 8:
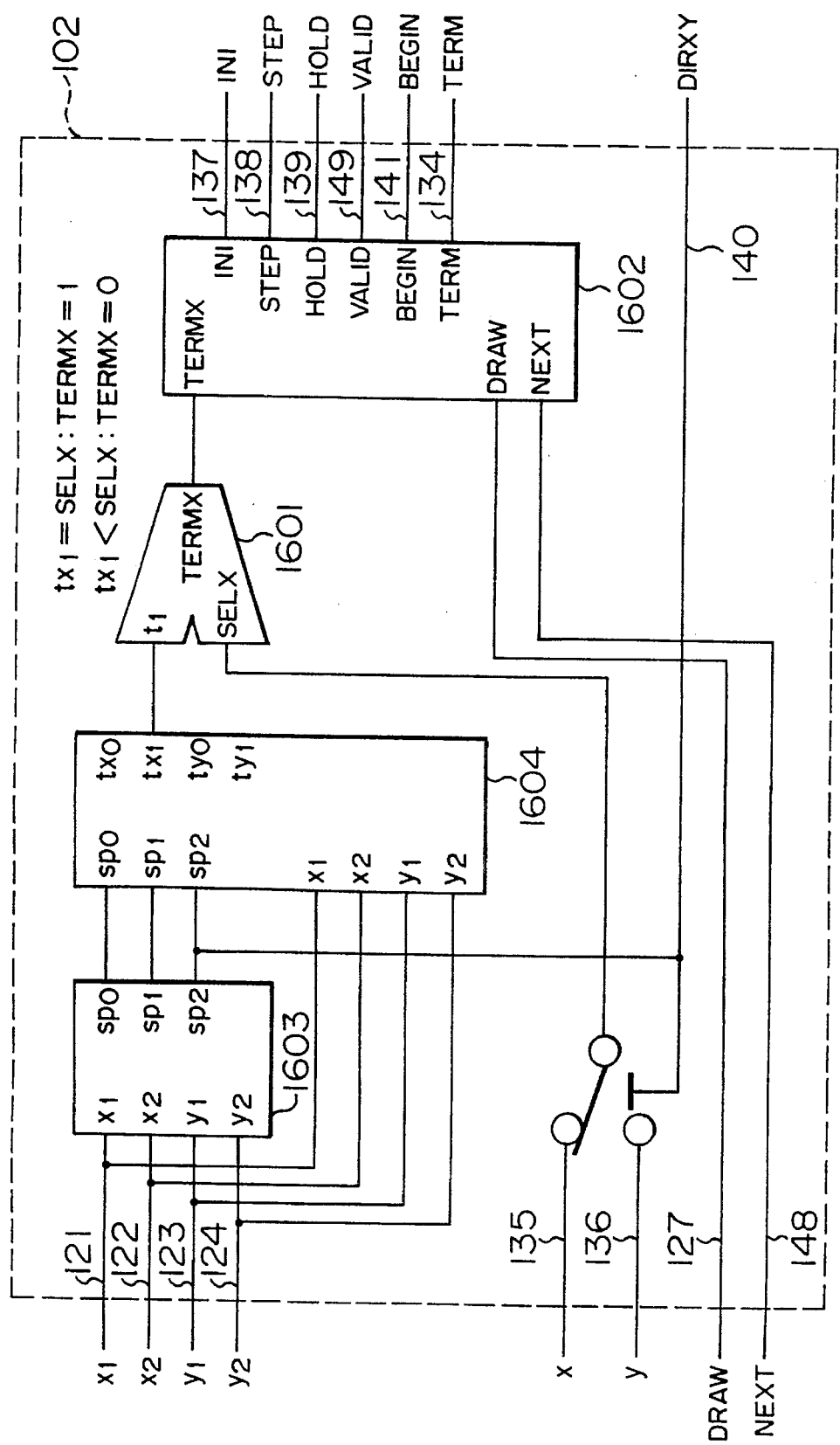
FIG. 8 shows the construction of a line sequencer constituting the antialias line generator of FIG. 1.
Figure 9:
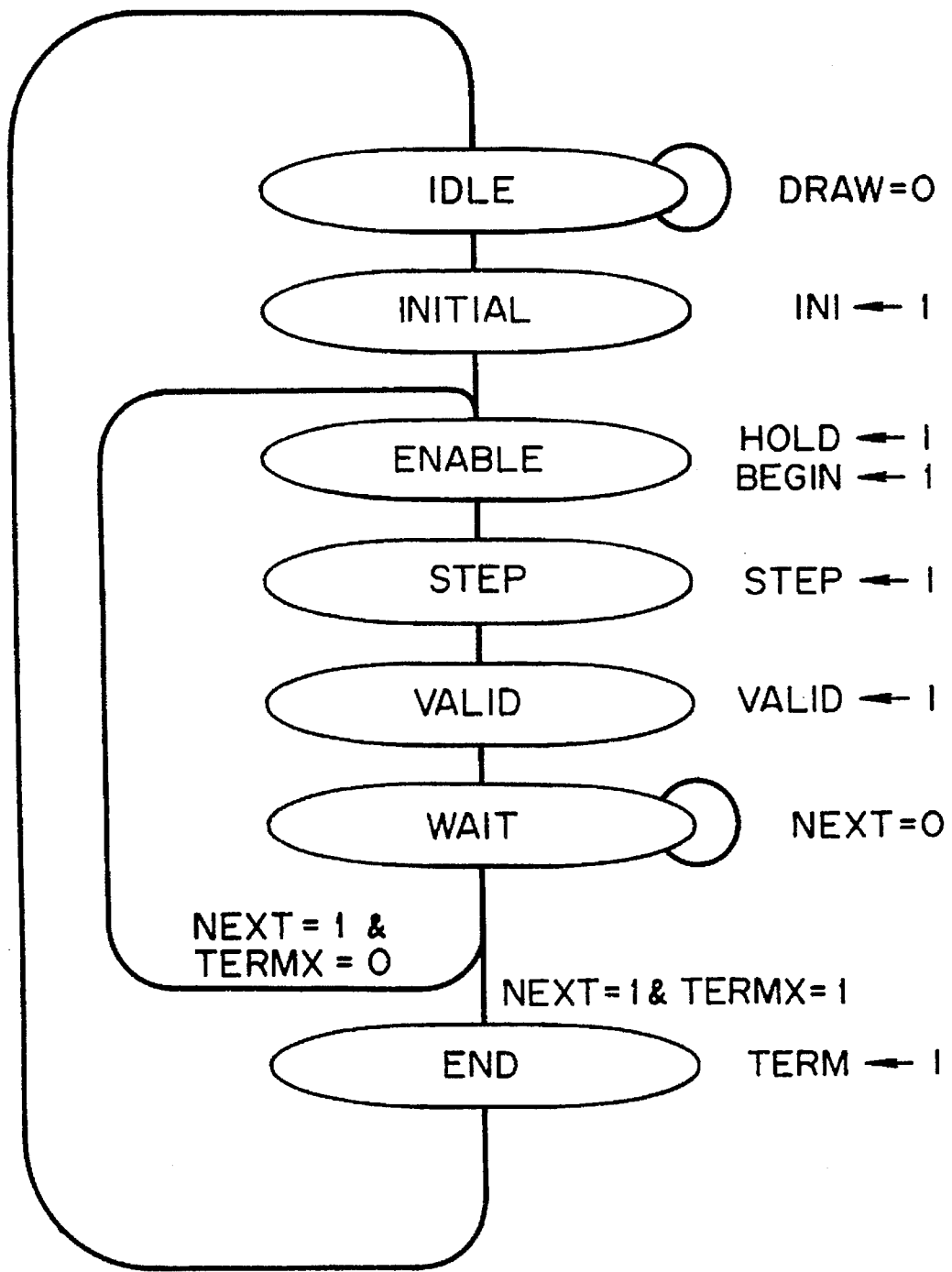
FIG. 9 shows the operation of a sequencer constituting the line sequencer of FIG. 8.

FIG. 8 shows the construction of the line sequencer 102. The line sequencer 102 includes a quadrant analyzer 1603, a mapping transformer 1604, a comparator 1601 and a sequencer 1602. The quadrant analyzer 1603 and mapping transformer 1604 perform transform of comparative axes and the comparator 1601 decides an end axis. The sequencer 1602 carries out the operation shown in FIG. 9 until the end decision by the comparator 1601 is settled five times. Like the intensity interpolator 106, the line sequencer 107 also performs the operation for interpolating pixel intensity.

Figure 10:
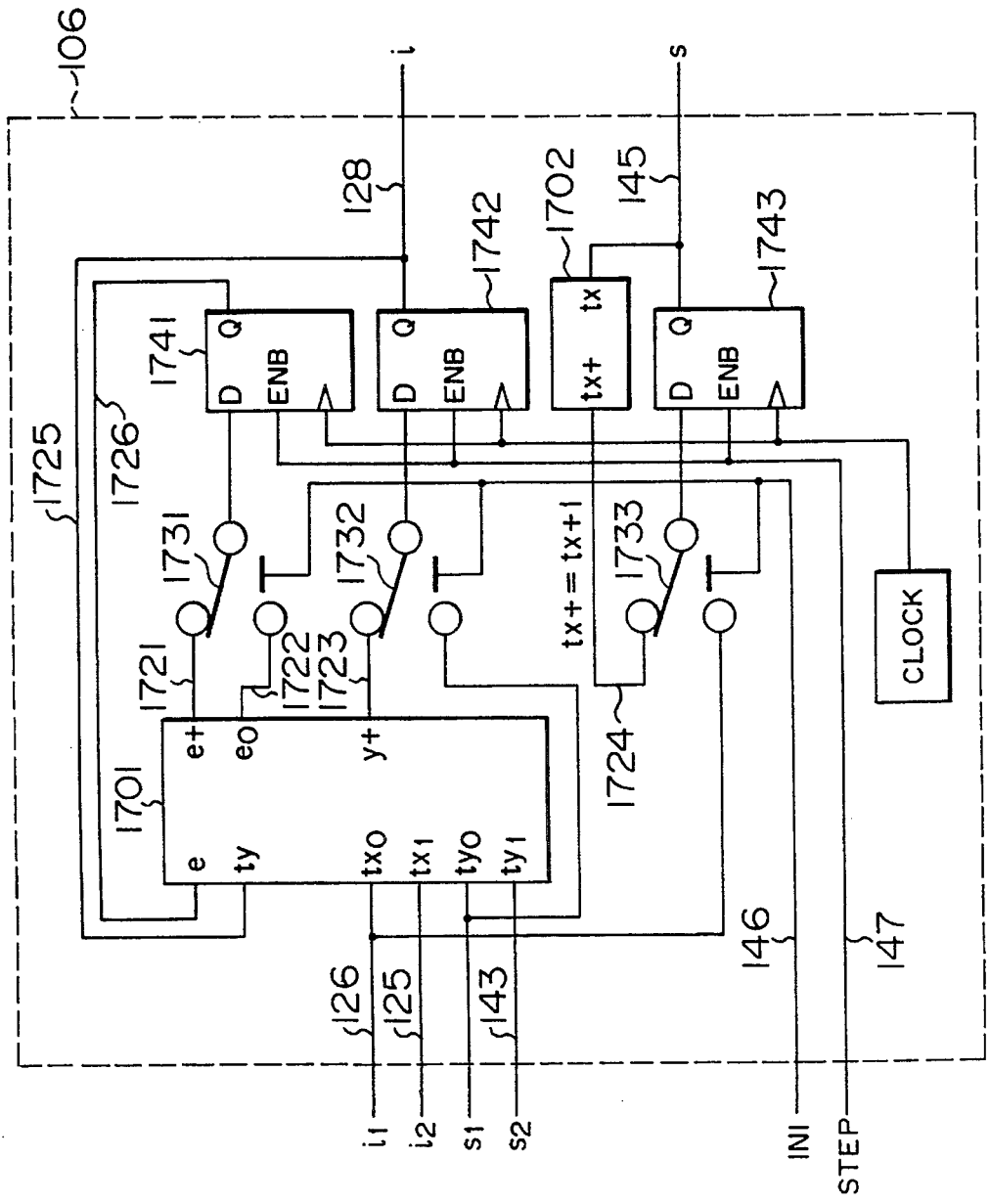
FIG. 10 shows the construction of an intensity interpolator constituting the antialias line generator of FIG. 1.

FIG. 10 shows the construction of the intensity interpolator 106. The intention interpolator 106 includes two pre-calculators (presettable up/down counters) 1701 and 1702 for performing DDA, three set signal switches 1731, 1732 and 1733 and three set signal latches 1741, 1742 and 1743. When the set signal switches 1731, 1732 and 1733 receive the ini signal 146, the respective set signal switches set an initiation point error initial value 1722, initiation point Y axis and initiation point X axis 126 of the pre-calculator 1701. Further, when the set signal latches 1741, 1742 and 1743 receive the step signal 147, the respective set signal latches set error value 1721 and Y axis 1723 of the pre-calculator 1701 and an X axis 1724. The step signal is delivered all the time of intensity interpolation. By performing the above operation, the intensity interpolator 106 generates an intensity value which permits smooth drawing of the line.

Figure 11:
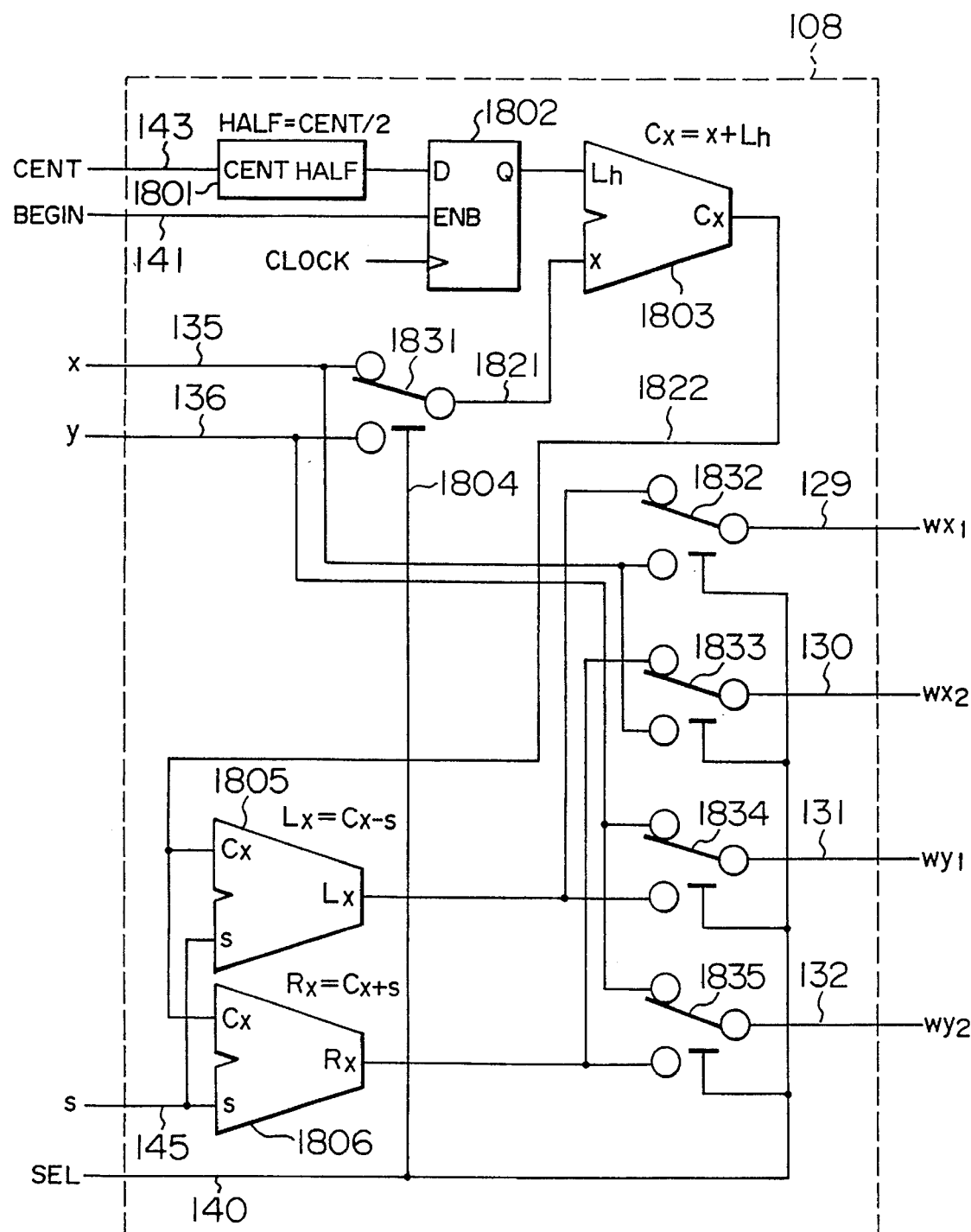
FIG. 11 shows the construction of a write axis calculator constituting the antialias line generator of FIG. 1.

FIG. 11 shows the construction of the write axis calculator 108. The write axis calculator 108 includes four calculators 1801, 1803, 1805 and 1806, one set signal latch 1802 and five set signal switches 1831, 1832, 1833, 1834 and 1835. The calculator 1801 halves an intensity set signal 143 and the set signal latch 1802 responds to a begin signal 141 to latch the signal halved by the calculator 1801. The calculator 1803 receives a latch signal from the latch 1802 and an interpolation direction signal 1821 from the set signal switch 1831 and generates a line segment central portion signal 1822. The calculators 1805 and 1806 receive the line segment central portion signal 1822 from the calculator 1803 and a related axis signal 145 from the intensity interpolator 106 and performs axis interpolation from center to outside of the line segment. At that time, a pixel intensity output signal 128 of the intensity interpolator 106 is interpolated simultaneously and as a result, intensity interpolation of the line segment constituting the antialiasing line is carried out. The switches 1831, 1832, 1833, 1834 and 1835 switch directions of the line segment in response to a directional signal 140.

Figure 12:
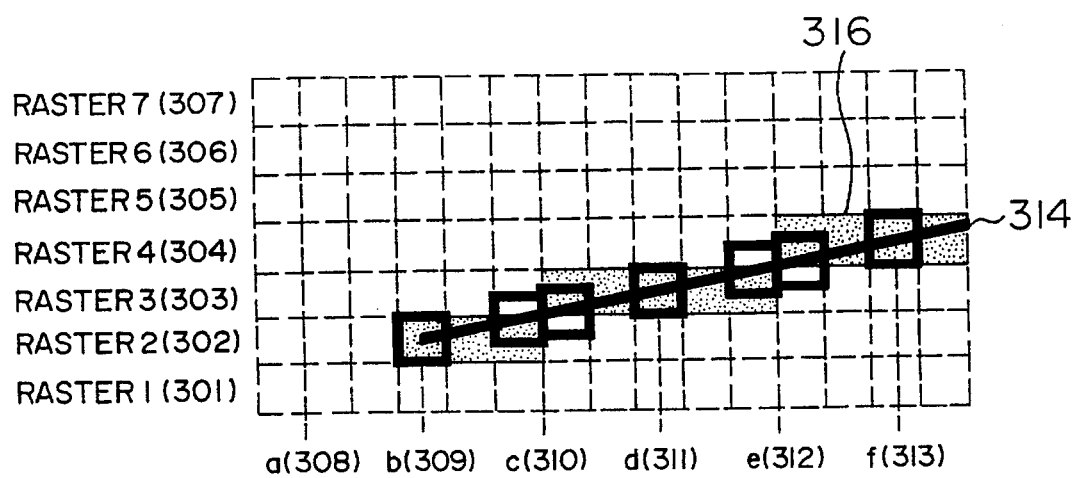
FIG. 12 shows line drawing by the antialias line generator of FIG. 1.

FIG. 12 shows drawing by the antialias line generator of the present invention. In the Figure, individual rasters represent the horizontal scanning line on the screen, where reference numeral 301 designates a drawing screen raster 1, 302 a drawing scanning raster 2, 303 a drawing scanning raster 3, 304 a drawing scanning raster 4, 305 a drawing scanning raster 5, 306 a drawing scanning raster 6 and 307 a drawing scanning raster 7. Respective screen points represent pixels in the horizontal direction of the screen, where reference numeral 308 designates a drawing screen point a, 309 a drawing screen point b, 310 a drawing screen point c, 311 a drawing screen point d, 312 a drawing screen point e and 313 a drawing screen point f. Further, denoted by 314 is a drawn line displayed through the above operation and by 316 is a drawing point not subjected to antialiasing display.

Figure 13:
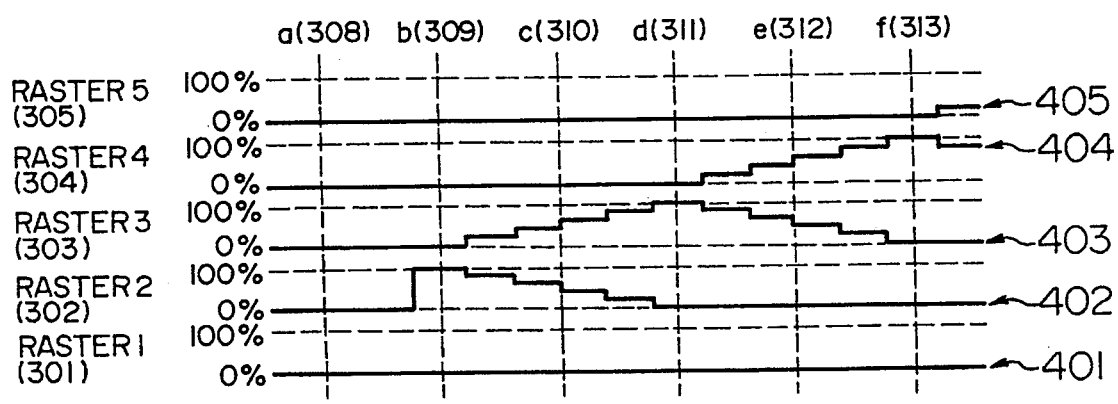
FIG. 13 shows changes in intensity in line drawing of FIG. 12.

FIG. 13 shows changes in intensity of drawing according to the present invention. In the Figure, reference numeral 401 designates intensity of the drawing raster screen 1 (301), 402 intensity of the drawing raster screen 2 (302), 403 intensity of the drawing raster screen 3 (303), 404 intensity of the drawing raster screen 4 (304) and 405 intensity of the drawing raster screen 5 (305).

Figure 14:
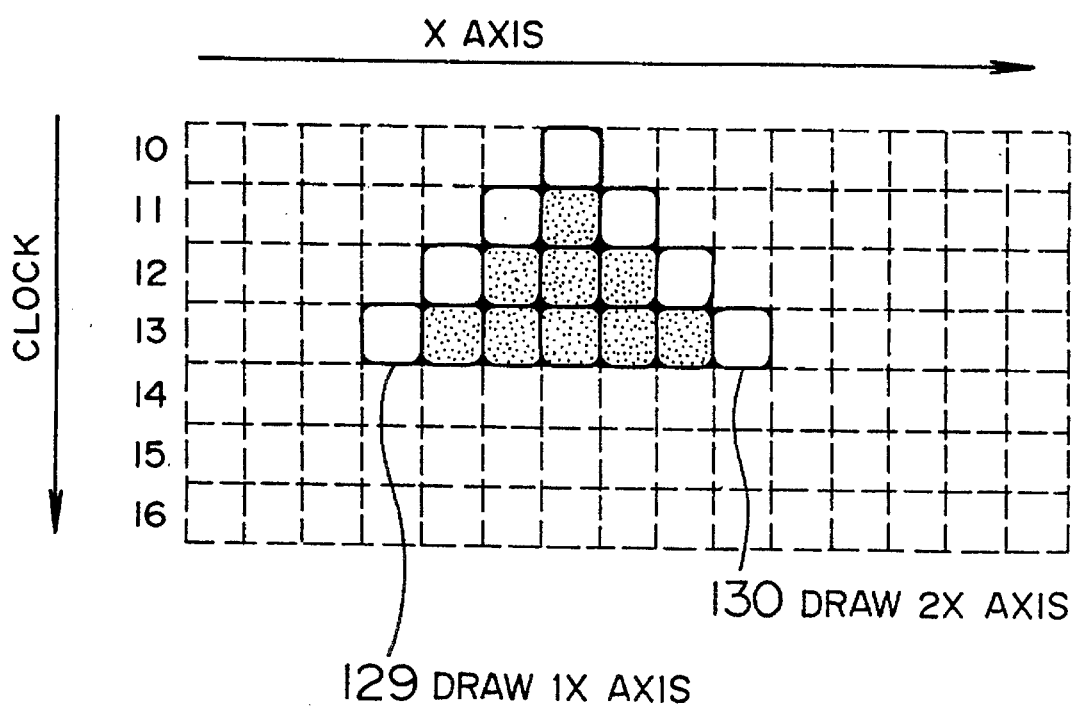
FIG. 14 shows a calculation process in the write axis calculator of FIG. 11.
Figure 15:
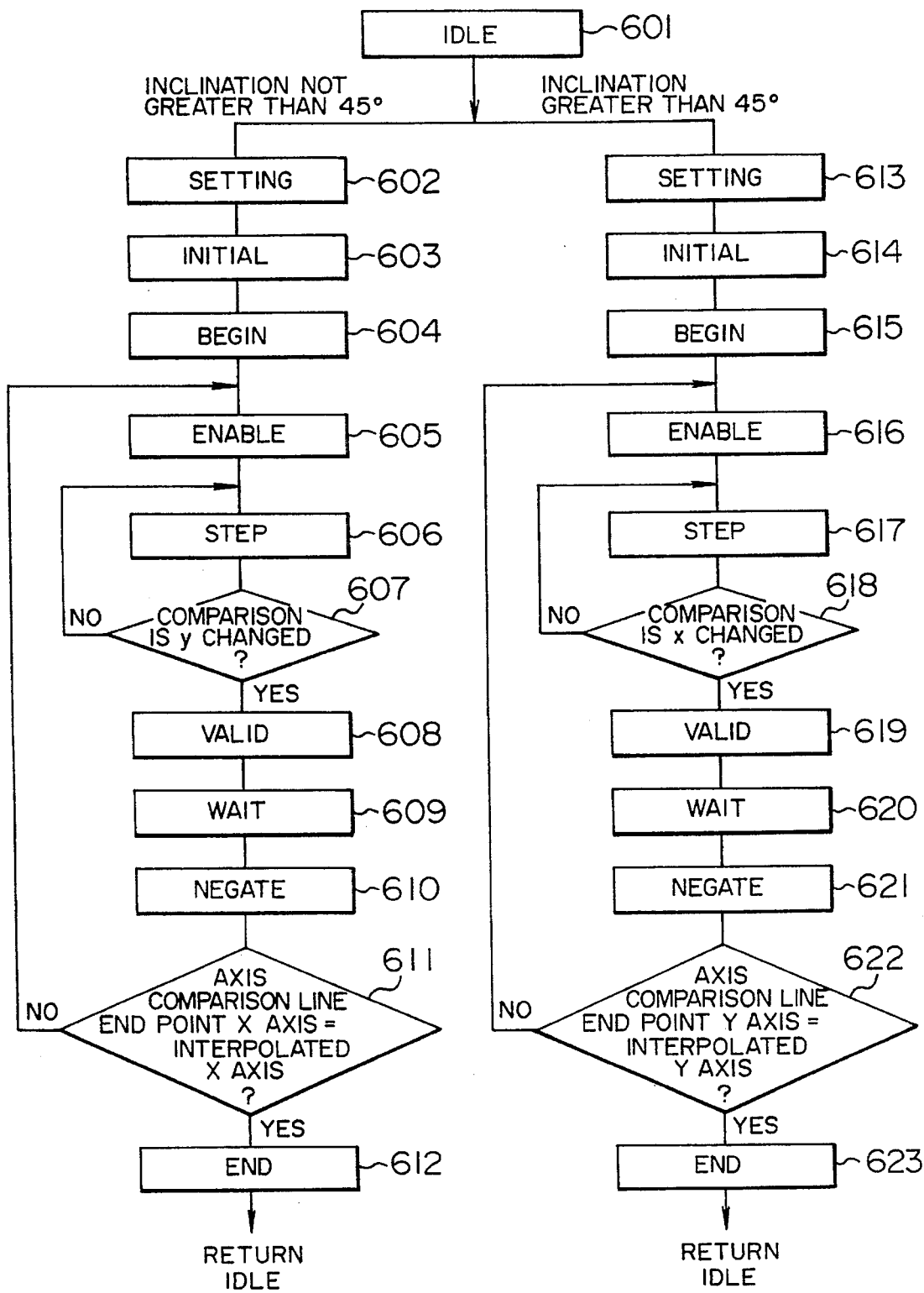
FIG. 15 is a flow chart showing the operation of the line sequencer of FIG. 8.
Figure 16:
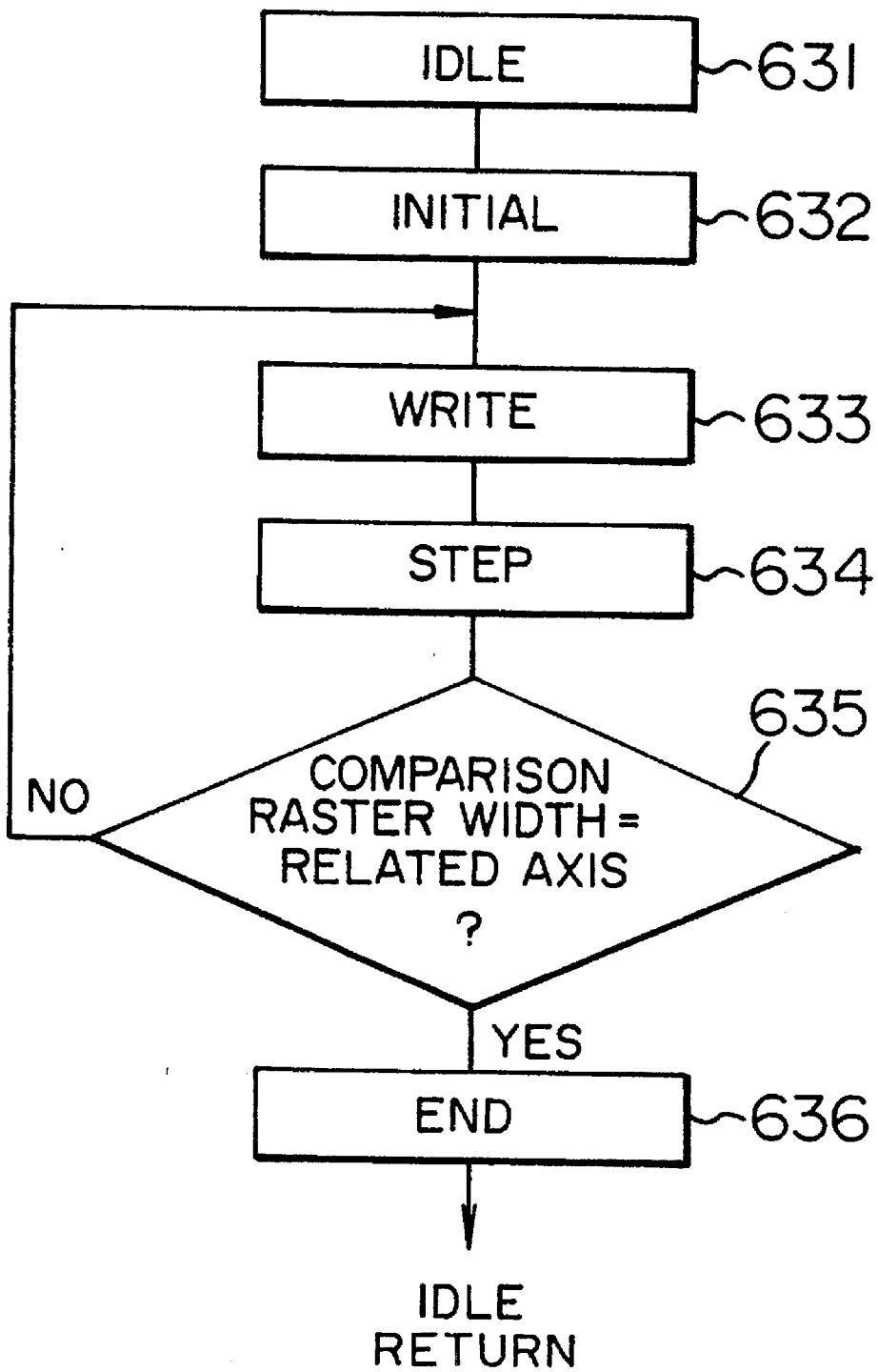
FIG. 16 is a flow chart showing the operation of an intensity sequencer constituting the antialias line generator of FIG. 1.
Figure 17:
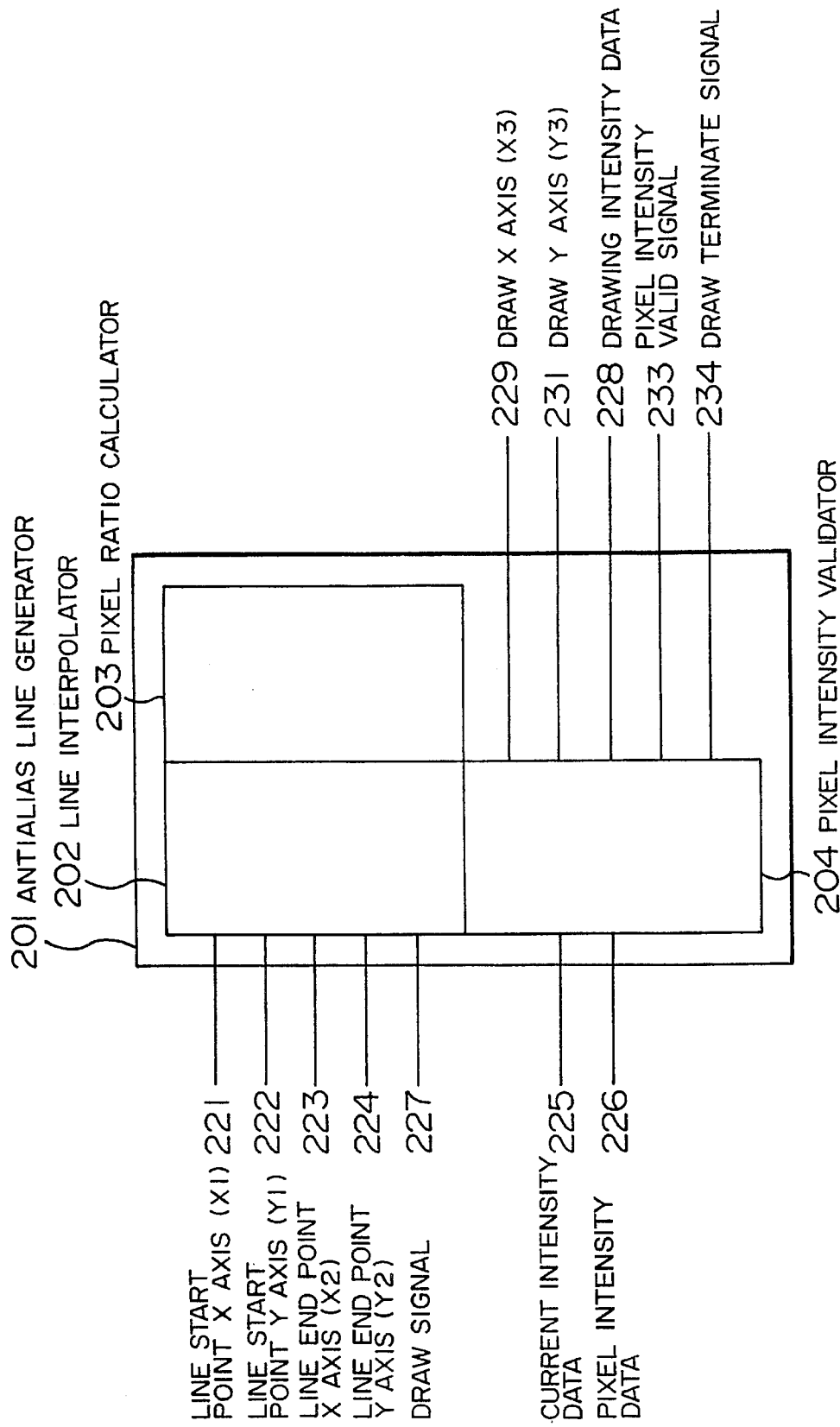
FIG. 17 is a block diagram of a conventional antialias line generator for realizing antialiasing.

FIG. 14 shows the calculation procedure by the write axis calculator 108 in which CENT indicates a center X point (always zero in the embodiment) of the line which is to be drawn by the antialias method; S indicates a distance from the center X point (CENT) of the line; X LATCH indicates an X point of a left end of the line; WX1 indicates a first produced draw point; and WX2 indicates a second produced draw point, FIG. 15 is a flow chart showing the logical contents of the line sequencer 102 of the present invention, and FIG. 16 is a flow chart showing the logical contents of the intensity sequencer 107 of the present invention. The operation of the invention will be described with reference to the flow charts of FIGS. 15 and 16.

Firstly, on the assumption that an axis of a start point represented by a line start point X axis (x1) 121 and a line start point Y axis (y1) 122 and an axis of an end point represented by a line end point X axis (x2) 123 and a line end point Y axis (y2) 124 are applied to the line interpolator 101 and line sequencer 102, the line sequencer 102 is placed in wait condition in idle phase 601.

When a draw signal 127 applied to the line sequencer 102 is asserted, the line interpolator 101 and the line sequencer 102 start line drawing on the basis of the line start point coordinate X component (x1) 121, line start point Y axis (y1) 122, line end point X axis (x2) 123 and line end point Y axis (y2) 124 on the basis of the current intensity data 125 and the pixel intensity data 126. At that time, the line sequencer 102 calculates an inclination of a line on the basis of the line start point X axis (x1) 121, line start point Y axis (y1) 122, line end point X axis (x2) 123 and line end point Y axis (y2) 124 and proceeds to set phase 602 if the inclination is not greater than 45 degrees but to set phase 613 if the inclination is greater than 45 degrees.

For example, on the assumption that the inclination of the line is not greater than 45 degrees, the line sequencer 102 consults the axes of the start and end points in set phase 602 to determine that the inclination of the line is not greater than 45 degrees and asserts a directional signal 140 indicating that interpolation is carried out in the direction of X axis. The axis selector 103 receives the directional signal 140 and selects an interpolated X axis 135 to deliver it as selected XY axis 142.

Subsequently, in initial phase 603, for the purpose of initializing the line interpolator 101, the line sequencer 102 asserts a line initial signal 137 during one clock. Receiving the line initial signal 137, the line interpolator 101 delivers a drawing start axis in the form of an interpolated X axis signal 135 and an interpolated Y axis signal 136 on the basis of the line start point X axis (x1) 121, line start point Y axis (y1) 122, line end point X axis (x2) 123 and line end point Y axis (y2).

Next, in begin phase 604, the line sequencer 102 asserts a begin signal indicative of the initial axis interpolation.

Next, in enable phase 605, for the purpose of latching the selected XY axis signal 142, the line sequencer 102 asserts an enable signal 139 during one clock. The axis latch 105 receives the enable signal to latch the contents of the selected XY axis signal 142 and delivers it in the form of the contents of a latched XY axis 144 for intensity interpolation. The subtracter 104 subtracts the latched XY axis signal 144 from the selected XY axis signal 142 to deliver a raster width 143 indicative of intensity interpolation width. Namely, the raster width 143 has an initial value of 0 and its value increases as the interpolation step proceeds.

Next, in step phase 606, the line sequencer 102 asserts a line step signal 138 for urging the line interpolator 101 to perform interpolation operation during one clock. Receiving the line step signal 138, the line interpolator 101 carries out interpolation for the next step (pixel) and delivers new interpolated X axis 135 and interpolated Y axis 136.

Next, in comparison phase 607, the line sequencer 102 compares the interpolated Y axis 136 which the line interpolator 101 has delivered previously with the interpolated Y axis 136 delivered presently and returns to step phase 606 if the comparison result indicates coincidence (axis Y does not change) but proceeds to valid phase 608 if non-coincidence (axis Y changes). Thus, the line sequencer 102 repeats the step phase 606 until the interpolated Y axis 136 changes.

Subsequently, as the line sequencer 102 proceeds to valid phase 608, the line sequencer 102 asserts a line valid signal 149 indicating that the raster width 143 is validated during one clock and then proceeds to wait phase 609.

On the other hand, the intensity sequencer 107 receives the line valid signal 149 and proceeds from idle phase 631 to initial phase 632. Then, in the initial phase 632, the intensity sequencer 107 asserts an intensity initial signal 146 for performing initialization of the intensity interpolator 106 during one clock.

Next, the intensity sequencer 107 proceeds to write phase 633. The intensity interpolator 106 receives the intensity initial signal 146 and a step signal 147 for a necessary clock period, delivers a related axis 145 and drawing intensity data 128 and asserts the pixel intensity valid signal 133 during one clock.

On the basis of the interpolated X axis 135, interpolated Y axis 136, direction signal 140 and begin signal 141, the write axis calculator 108 generates a draw X axis (1X3) 129 and a draw Y axis (1Y3) 131 as axis parameters of the first pixel constituting the line and a draw X axis (2X3) 130 and a draw Y axis (2Y3) 132 as axis parameters of the second pixel.

FIG. 14 shows the procedure for generation of rasters through the above calculation by the write axis calculator 108. The calculation procedure will be described again by referring to signals involved. Receiving the begin signal 141, the write axis calculator 108 latches an interpolated X axis 135 at that time and delivers a draw X axis (1X3) 129 obtained by adding ½ of an initial center value (signal terminal cent) to the interpolated X axis 135 and subtracting a related axis 145 from the sum, a draw X axis (2X3) 130 obtained by adding ½ of the initial center value (signal terminal cent) to the interpolated x axis 135 and adding the related axis 145 to the sum, and an interpolated Y axis 136 which substantially remains unchanged and is represented by a draw Y axis (1Y3) 131 and a draw Y axis (2Y3) 132.

Thus, when the begin signal 141 is asserted at t0, the raster grows in both directions on X axis as time t elapses, in accordance with the related axis 145 which has the initial value beginning with 0 and being updated every clock, thereby generating seven pixels at t3.

Subsequently, the intensity sequencer 107 proceeds to step phase 634. The intensity sequencer 107 asserts the pixel intensity valid signal 133 and at the same time performs drawing with an intensity indicated by the drawing intensity data signal 128 at pixel axis represented by the draw X axis (2X3) 130 and draw Y axis (2Y3) 132. If the begin signal 141 is negated, drawing is carried out with an intensity obtained by subtracting an intensity indicated by the drawing intensity data 128 from the maximum intensity at a pixel axis represented by the draw X axis (1X3) 129 and draw axis Y (1Y3) 131. At that time, since the pixel intensity data 128 is gradually changed to the intensity of the background by means of the intensity interpolator 106, a raster 403 as shown in FIG. 13 is generated.

Next, the intensity sequencer 107 proceeds to comparison phase 635. Receiving the next step signal 147, the intensity interpolator 106 performs the next interpolation and delivers a related axis 145 and drawing intensity data 128. If a comparison of the raster width 143 with the related axis 145 indicates non-coincidence of the raster width 143 with the related axis 145, the intensity sequencer 107 proceeds to write phase 633. If coincidence occurs, it proceeds to end phase 636. In this manner, the write phase 633 and step phase 634 are repeated until drawing of raster is completed.

When the intensity sequencer 107 proceeds to the end phase 636, an intensity terminate 148 informing the line sequencer 102 of the end of the drawing operation by the intensity sequencer 107 is asserted during one clock and the intensity sequencer 107 proceeds to idle phase 631.

Next, the line sequencer 102 waiting in wait phase 609 proceeds to negate phase 610 when the intensity terminate 148 is asserted and the line sequencer 102 negates the begin signal 141.

Next, the line sequencer 102 proceeds to axis comparison phase 611. The line end point X axis (x2) 123 is compared with the interpolated X axis 135 and if the line end point X axis (x2) 123 is not coincident with the interpolated X axis 135, the line sequencer 102 proceeds to enable phase 605. If coincident, the line sequencer proceeds to end phase 612. In this manner, the hold phase 605 to axis comparison phase 611 are repeated until the line drawing ends.

As the line sequencer proceeds to the end phase 612, it asserts the draw terminate signal 134 indicative of the end of the line drawing operation during one clock and again proceeds to the idle phase 601.

While in the foregoing embodiment the phases 602 to 612 have been described by referring to the example where the inclination of the line is not greater than 45 degrees, the foregoing embodiment can be applied to the case where the inclination of the line is greater than 45 degrees by replacing X with Y in the phases 613 to 623 and such a case will not be described to avoid prolixity of explanation.

By performing the above operation, drawing is effected as shown in FIG. 13 on the draw screen rasters 1 (301) to 5 (305) at five levels of intensity 401 to 405 for the draw screen rasters 1 to 5, respectively, and a smooth line can be realized.

Figure 18:
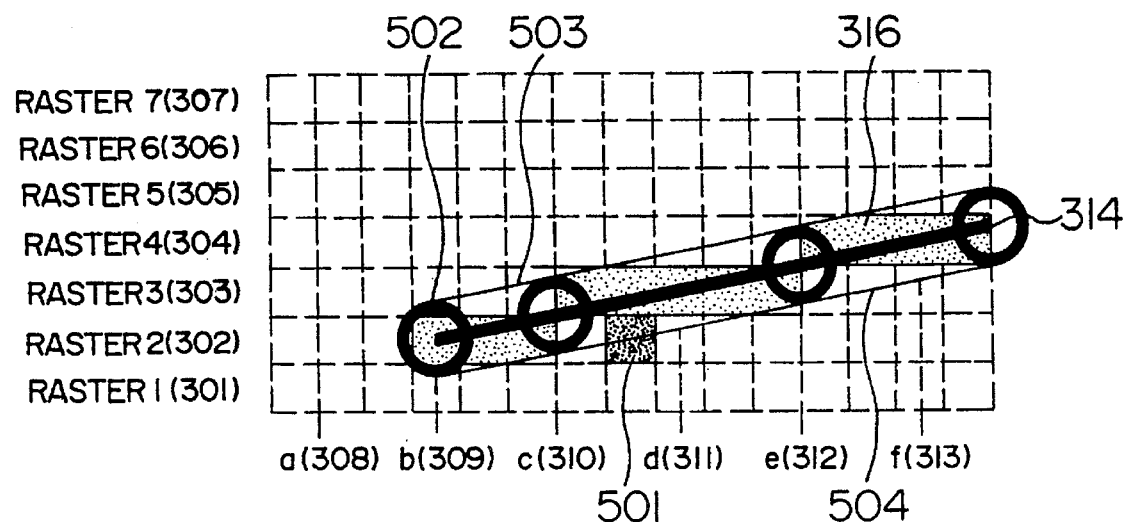
FIG. 18 shows a display image by the antialias line generator of FIG. 17.
Figure 19:
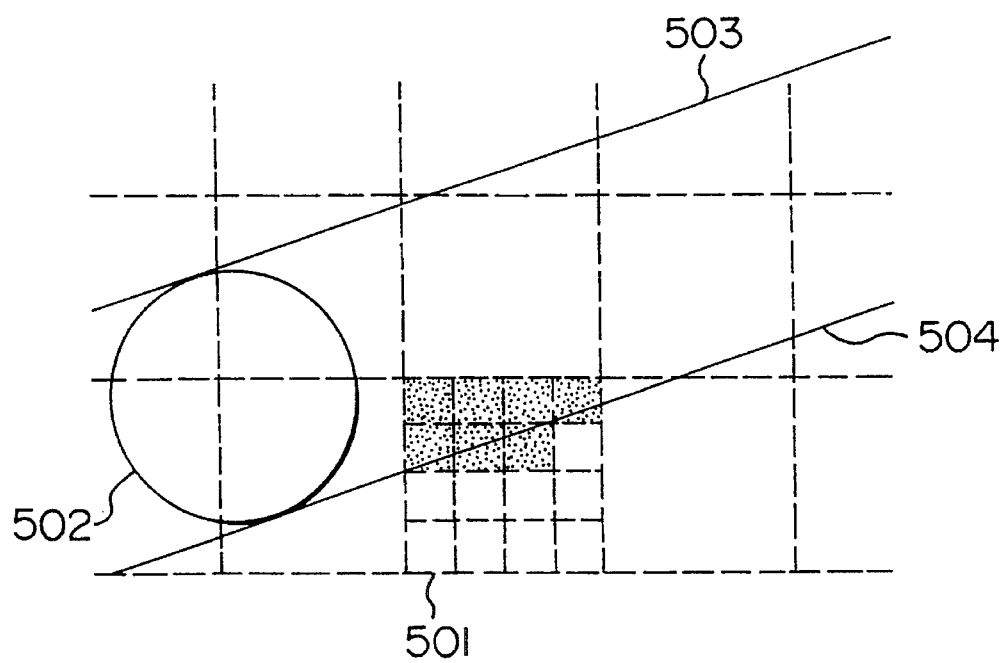
FIG. 19 is an enlarged view of a pixel of FIG. 18.

When noticing the drawing speed of screen raster, at least 16 clocks are necessary for the conventional technique to calculate the intensity of one pixel as shown FIG. 18 whereas according to the present invention one clock suffices to draw two pixels as shown in FIG. 14, demonstrating that drawing at a high speed which is theoretically 32 times that of the conventional technique can be ensured.

The invention aims at high-speed drawing of a line but as well known in the art, a curve can be approximated by lines by applying the DDA technique and obviously, the high-speed drawing technique of the present invention can also be applied to drawing of a curve.

I claim:

1. An antialias line generator based method, the antialias line generator including line interpolating means, intensity interpolating means, deviation calculating means, and write axis calculating means, the method comprising the steps of:

performing axis interpolation, with the line interpolating means, on the basis of axes of opposite ends of a line;

performing intensity interpolation, with the intensity interpolating means, on the basis of current intensity data and new pixel intensity data;

calculating a deviation, with the deviation calculating means, between the axes of the opposite ends of the line and an axis of a pixel subjected to intensity correction; and performing calculation, with the write axis calculating means, which begins with an axis of the center of the line to be displayed, to determine an axis of one end of the line by subtracting ½ of the deviation from the center axis and to determine an axis of the other end of the line by adding ½ of the deviation to the center axis.

2. An antialias line generating method according to claim 1 wherein the deviation calculating means includes an axis selector, an axis latch, and a subtracter, and wherein said step of calculating a deviation with the deviation calculating means comprises the steps of:

selecting data of an axis data, with the axis selector, on any one of X and Y axes on the basis of an inclination of the line;

latching data of an axis to be interpolated with the axis latch; and subtracting the data of the axis to be interpolated from the selected axis data with the subtracter.

3. An antialias line generating method according to claim 1 wherein said step of performing calculation comprises starting calculation from an axis of a pixel to be displayed at the center and determining axes of the opposite ends of the line to be displayed every clock.

4. An antialias line generator based method, the antialias line generator including line interpolating means, intensity interpolating means, an axis selector, an axis latch, a subtracter, deviation calculating means, and write axis calculating means, the method comprising the steps of:

performing axis interpolation, with the line interpolating means, on the basis of axes of opposite ends of a line;

performing intensity interpolation, with the intensity interpolating means on the basis of current intensity data and new pixel intensity data;

selecting data of an axis on any one of X and Y axes on the basis of an inclination of the line with the axis selector;

latching data of an axis to be interpolated with the axis latch;

subtracting the data of the axis to be interpolated from the selected axis data with the subtracter;

calculating a deviation, with the deviation calculating means, between the axes of the opposite ends of the line and an axis of a pixel subjected to intensity correction; and performing calculation, with the write axis calculating means, from an axis of a pixel to be displayed at the center to determine an axis of one end of the line by subtracting ½ of the deviation from the center axis and to determine an axis of the other end of the line by adding ½ of the deviation to the center axis.

5. An antialias line generator comprising:

line interpolating means for performing axis interpolation on the basis of axes of opposite ends of a line;

intensity interpolating means for performing intensity interpolation on the basis of current intensity data and pixel intensity data;

deviation calculating means for calculating a deviation between the axes of the opposite ends of the line and an axis of a pixel subjected to intensity correction; and write axis calculating means for performing calculation which begins with the axis of the center of the line to be displayed, to determined an axis of one end of the line by subtracting ½ of the deviation from the center axis, and to determine the other end by adding ½ of the deviation to the center axis;

wherein said deviation calculating means comprises an axis selector comprised of selector elements and adapted to select data of an axis on any one of X and Y axes on the basis of an inclination of the line, an axis latch comprised of flip-flop elements and adapted to latch data of an axis to be interpolated, and a subtracter comprised of subtraction elements and adapted to subtract the data of the axis to be interpolated from the selected axis data.

6. An antialias line generator comprising:

line interpolating means for performing axis interpolation on the basis of axes of opposite ends of a line;

intensity interpolating means for performing intensity interpolation on the basis of current intensity data and pixel intensity data;

deviation calculating means for calculating deviation between the axes of the opposite ends of the line and an axis of a pixel subjected to intensity correction; and write axis calculating means for performing calculation which begins with the axis of the center of the line to be displayed, to determine an axis of one end of the line by subtracting ½ of the deviation from the center axis, and to determine the other end by adding ½ of the deviation to the center axis;

wherein said write axis calculating means comprises calculators and starts calculation from an axis of a pixel to be displayed at the center and determines axes of the opposite ends of the line to be displayed every clock.

7. An antialias line generator for performing antialiasing drawing of a line at a high speed, comprising:

line interpolating means for performing axis interpolation on the basis of axes of opposite ends of the line, said line interpolating means having a line interpolator comprised of presettable up/down counter elements and adapted to perform axis interpolation on the basis of axes of opposite ends of the line and a line sequencer comprised of logical elements for controlling the sequence of axis interpolation effected by said line interpolator;

intensity interpolating means for performing intensity interpolation on the basis of current intensity data and pixel intensity data, said intensity interpolating means having an intensity interpolator comprised of presettable up/down counter elements and adapted to perform intensity interpolation on the basis of the current intensity data and the pixel intensity data and an intensity sequencer comprised of logical elements for controlling the sequence of intensity interpolation effected by said intensity interpolator;

deviation calculating means for calculating a deviation, said deviation calculating means having an axis selector comprised of selector elements and adapted to select data of an axis on any one of X and Y axes on the basis of an inclination of the line, an axis latch comprised of flip-flop elements and adapted to latch data of an axis to be interpolated, and a subtracter comprised of subtracting elements and adapted to subtract the data of the axis to be interpolated from the selected axis data; and write axis calculating means comprised of calculators and adapted to perform calculation which begins with an axis of a pixel to be displayed at the center to start calculation from an axis of the center of the line to be displayed every clock, and determine an axis of one end of the line by subtracting ½ of the deviation from the center axis and determine the other end by adding ½ of the deviation to the center axis.

* * * * *